UNITED STATES PATENT OFFICE.

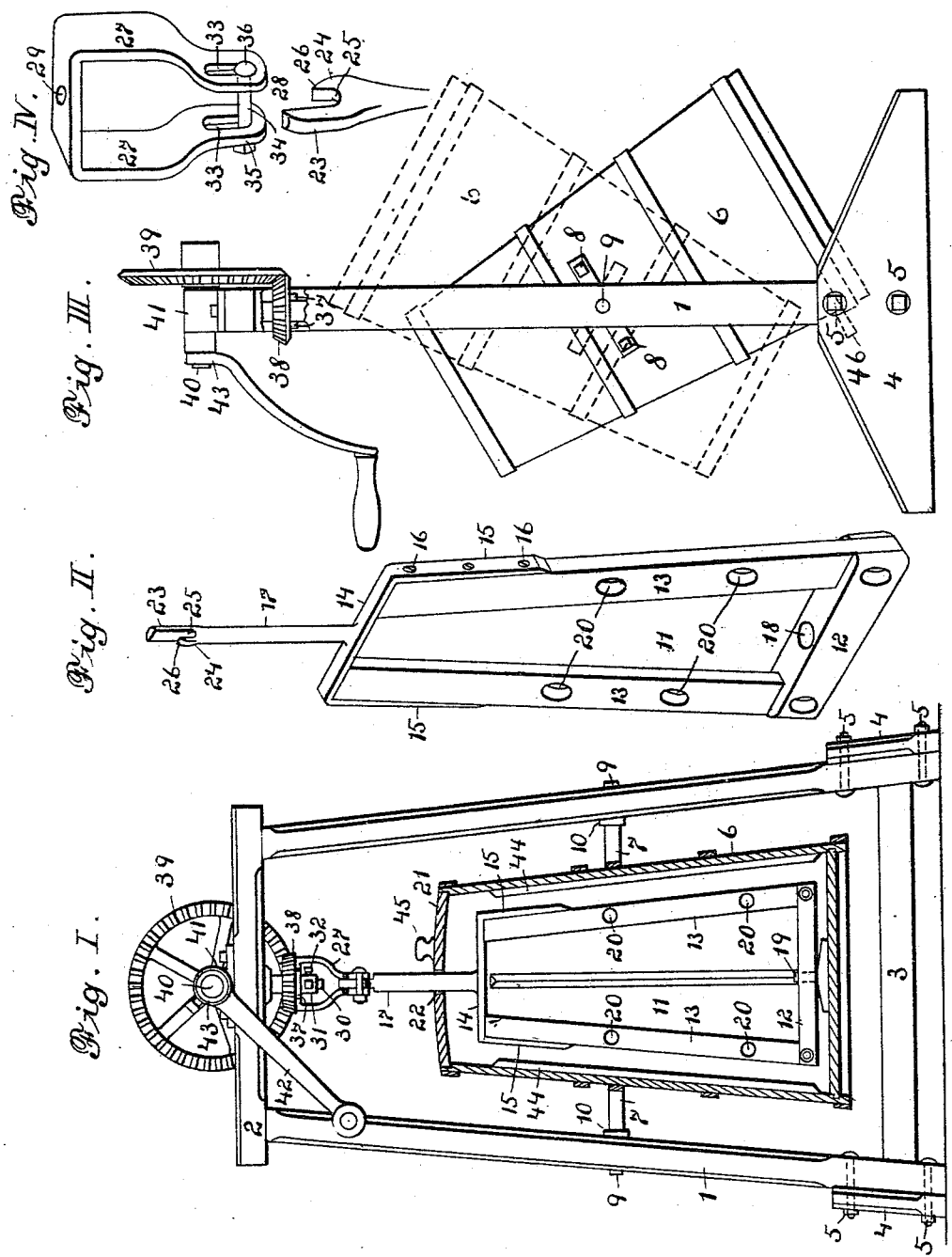

WILLIAM H. PHILPOT, OF HUMBOLDT, NEBRASKA, ASSIGNOR OF TWO-THIRDS TO DAVID SPEISER, JR., OF SAME PLACE, AND JACOB F. SNETHEN, OF DAWSON, NEBRASKA.

CHURN.

SPECIFICATION forming part of Letters Patent No. 458,482, dated August 25, 1891.

Application filed January 2, 1891. Serial No. 376,527. (No model.)

*To all whom it may concern:*

Be it known that I, WILLIAM H. PHILPOT, of Humboldt, in the county of Richardson and State of Nebraska, have invented certain new and useful Improvements in Churns, of which the following is a full, clear, and exact description, reference being had to the accompanying drawings, which form a part of this specification.

My invention relates to an improvement in churns; and my invention consists in features of novelty hereinafter described, and pointed out in the claims.

Figure I is a vertical section of my improved churn, showing portions of the supporting-frame and gearing in full lines. Fig. II is an enlarged perspective of the dash. Fig. III is a side elevation. Fig. IV is an enlarged detail perspective showing the coupling device between the gearing and shaft on the dash.

Referring to the drawings, 1 represents the vertical supporting-frame connected at the top and bottom by cross-pieces 2 3.

4 represents feet secured to the frame 1 near its lower end by bolts 5, said feet serving to hold the frame 1 in an upright position.

6 represents the body of the churn proper, which is made in the common form, that of being of greater circumference at the bottom than at the top.

The body of the churn is pivoted to the frame 1 by means of gudgeons 7, secured to the body by means of bolts 8. The outer ends of the gudgeons are journaled in the frame, as shown at 9, there being collars 10 on the same to limit their outward movement. By thus pivoting the body of the churn the same may be turned bottom up, as shown in Fig. II, and left in this position in order to drain. The dash 11 is of pyramidical form, having a base-piece 12, uprights 13, and a metal strap 14, connecting the uprights 13 at their upper ends and extending down the sides of the same, as shown at 15, being secured thereto by screws 16.

17 represents a shaft which is an integral part of the strap 14, and extends up from the center of the same.

18 represents a hole in the center of the base-piece 12, which fits over a pin 19, secured to the bottom of the churn. The dash is thus permitted to rotate and held at the bottom in its proper position.

20 represents holes in the uprights 13 for the milk to flow through. The shaft 17 extends upward from its point of connection with the dash and passes through the lid 21, as shown at 22. The top of the shaft 17 terminates in a projection 23 and a shorter projection 24, between which is a socket or opening 25. The outer face of the projection 24 is beveled, as shown at 26.

27 represents a clevis open at its lower end, as shown at 28, and having a hole 29 in its upper end, which passes over and is secured to a pin 30 by a collar 31 and set-screw 32, the upper end of the pin 30 being suitably secured to the cross-piece 2. The clevis 27 is provided near its lower end with slots 33, in which works a horizontal pin 34, having heads 35 36, which retain it in its position in the slots. The coupling between the shaft 17 and the clevis 27 is formed by pressing the beveled face 26 of the projection 24 against the pin 34. Said pin is thereby forced over said projection, permitting the same to drop into the socket 25, thus completing the coupling, the projection 23 preventing the shaft from being forced past the pin. The upper end of the clevis 27 fits up between two lugs 37 on the under side of a bevel-gear 38, which is also journaled on the pin 30, the clevis being thereby rotated with the bevel-gear 38, and the dash thus made to rotate in the churn.

39 represents a bevel-gear meshing in the gear 38, said gear 39 being secured to one end of a shaft 40, which is journaled on the top of the frame 2, as shown at 41, 42 representing a crank secured to the shaft 40, as shown at 43, by which means the churn is operated.

44 represents vertical brakes secured to the inner side of the churn and against which the milk is forced by the dash and the butter thereby formed.

45 represents a knob on the lid for the purpose of handling the same, and 46 represents a plug located near the bottom of the churn, by which means any liquid may be drawn off.

By the use of my device it will be seen that

I can readily uncouple the body of the churn or the dash from its operating-gear and that the same may be tilted, as shown in Fig. III, in order to fill the churn or to remove its contents, or it may be turned bottom side up and left to drain.

I claim as my invention—

1. The combination of the body 6, dash 11, shaft 17, and a clevis 27, said shaft having a socket 25, and said clevis having a pin 34 for engaging the same, substantially as set forth.

2. The combination of the body 6, dash 11, shaft 17, said shaft having a projection 23, a shorter projection 24, a socket 25 between the same, a clevis 27, slots 33 in the clevis, and a pin 34, working in said slots for the purpose of engaging in the socket 25 in the shaft 17, substantially as set forth.

3. The combination of the body 6, dash 11, shaft 17, secured to the dash by a strap 14, projections 23 24 on said shaft, said projection 24 having an outer bevel face 26, clevis 27, having slots 33, and a pin 34, working in said slots, substantially as set forth.

4. The combination, with the frame 1, the churn-body 6, the dash 11, having vertical shaft 17, and suitable driving mechanism, of means for connecting the dash-shaft with the driving mechanism, consisting of the clevis 27, carrying a gear-wheel and engaging the shaft at its lower end, the downwardly-extending pin 30, projecting through the clevis, and the collar 31 on said pin, having means for securing it thereon, all substantially as set forth.

WILLIAM H. PHILPOT.

Witnesses:
  C. P. DALBEY,
  JAS. E. KNIGHT.